United States Patent [19]
Feldman

[11] 3,752,591
[45] Aug. 14, 1973

[54] SEXTANT WITH DIGITAL READOUT AND NIGHT VIEWING CAPABILITY

[75] Inventor: Sidney Feldman, Silver Spring, Md.

[73] Assignee: The United States of America as represented by the Secretary of the Navy, Washington, D.C.

[22] Filed: Aug. 4, 1971

[21] Appl. No.: 168,931

[52] U.S. Cl................... 356/247, 356/140, 356/253
[51] Int. Cl. ......................... G01c 1/08, G02b 23/12
[58] Field of Search ........................... 356/138–149, 247–250, 253–255; 350/54, 84

[56] References Cited
UNITED STATES PATENTS

| | | | |
|---|---|---|---|
| 2,338,325 | 1/1944 | Friar | 356/145 |
| 3,001,289 | 9/1961 | Carbonara | 356/147 X |
| 2,946,255 | 7/1960 | Bolay | 350/54 X |
| 2,662,444 | 12/1953 | Gradisar | 350/84 |

FOREIGN PATENTS OR APPLICATIONS

| | | | |
|---|---|---|---|
| 511,696 | 8/1939 | Great Britain | 356/145 |
| 821,775 | 8/1937 | France | 356/140 |

Primary Examiner—David H. Rubin
Attorney—R. S. Sciascia, J. A. Cooke et al.

[57] ABSTRACT

A navigation instrument for measuring the altitude of celestial bodies above the horizon adaptable to use with ordinary iron sights, a standard telescope for daylight viewing, and an electronic image enhancing telescope for night viewing of the horizon. Digital readout of the altitude of the celestial bodies is available on the instrument as well as electrically telemetering this information to a remote site where it may be recorded along with the time of observation.

3 Claims, 2 Drawing Figures

PATENTED AUG 14 1973

3,752,591

INVENTOR.
SIDNEY FELDMAN
BY AGENT

ATTORNEY

SEXTANT WITH DIGITAL READOUT AND NIGHT VIEWING CAPABILITY

BACKGROUND OF THE INVENTION

This invention relates generally to navigation instruments for measuring the angle between two points using multisight lines from the observer's position, and more particularly to sextants for measuring the angle of elevation of celestial bodies above the horizon.

The traditional sextant in use today has been substantially the same design for at least 250 years and generally is in the form of a hand-held frame having the shape of a quadrant of a circle with vernier scale indicia indicating degrees, minutes, and seconds of arc about its circumference, and a rotatable arm fixed at the center of the quadrant with a fiduciary index cooperating with the indicia. Attached to the arm and movable therewith, is a tiltable mirror for reflecting the image of a celestial body into a horizontally mounted sight such as iron sights or a telescope on the frame. The sextant is used by holding the frame usually in the left hand and sighting at the horizon, while at the same time rotating the arm and therefore the mirror to bring the reflected image of the chosen celestial body into coincidence with the horizon. When coincidence is obtained, the navigator must call "mark" to a helper who notes the exact time to the second. The sextant is then lowered from the viewing position by the navigator to read the angle of the elevation on the indicia scale and this information is given to the helper to record. It is possible for one man to perform the operation by taking the observation, quickly reading his watch, then later recording both the time and the altitude of the celestial body however, this method is less accurate and subject to errors in transcribing the required data.

Other sextants in the prior art have attempted to solve the disadvantages of the traditional sextant by providing means whereby the navigator may press a button to either start or stop a watch to note the time when the celestial body's image coincides with the horizon. Further, other prior art devices have attempted to relieve the difficulty in reading an angle scale and vernier scale for determining degrees, minutes and seconds of arc by providing adjustment of the mirror angle with knobs concomitant with digital readout devices. As is obvious, however, these devices again must be lowered from the viewing position to the position where the angle of elevation may be read and then recorded manually along with the time.

A particular problem with all sextants, including the traditional one and the previously known adaptations thereof is the fact that celestial navigation must be performed either during the day, when the sun and the moon are visible, or at either morning or evening twilight, for the reason that the horizon must also be visible. Sextants having artificial horizon devices in the form of a bubble or pendulum have been devised to eliminate a need for a view of the horizon, but these devices are subject to inaccuracies due to the fact that the navigator operator is generally on a moving platform such as a ship or aircraft. Obviously, the most accurate celestial navigational fixes could be obtained at night when many stars are visible if there was means for seeing the actual horizon.

SUMMARY OF THE INVENTION

Accordingly an object of the present invention is to provide a sextant that can be more conveniently used.

Another object of the instant invention is to provide a sextant that may be held by and used in the left or the right hand.

A further object of the invention is to provide a sextant having the capability of viewing the horizon at night.

A still further object of the instant invention is to provide a sextant having a display of the measurement that is easy to read.

Still another object of the present invention is to provide a sextant that will provide a remote display of the angle of elevation of the observed celestial body.

Briefly, these and other objects of the present invention are attained by the use of a sextant configured in a form of a open box frame adaptable to accept a sighting tube, iron sights, a telescope, or night viewing scope within the frame, a tiltable mirror connected through a gear train to appropriate adjustment knobs and a digital shaft rotation counter display. In addition, remote readout of the sextant may be attained by use of a shaft encoder which transmits a signal through a cable to a distant digital display.

BRIEF DESCRIPTION OF THE DRAWINGS

A more complete understanding of the invention and many of the attendant advantages thereof will be readily appreciated as the same becomes better understood by reference to the following detailed description when considered in connection with the accompanying drawings, wherein.

DESCRIPTION OF THE PREFERRED EMBODIMENT

Figure 1:
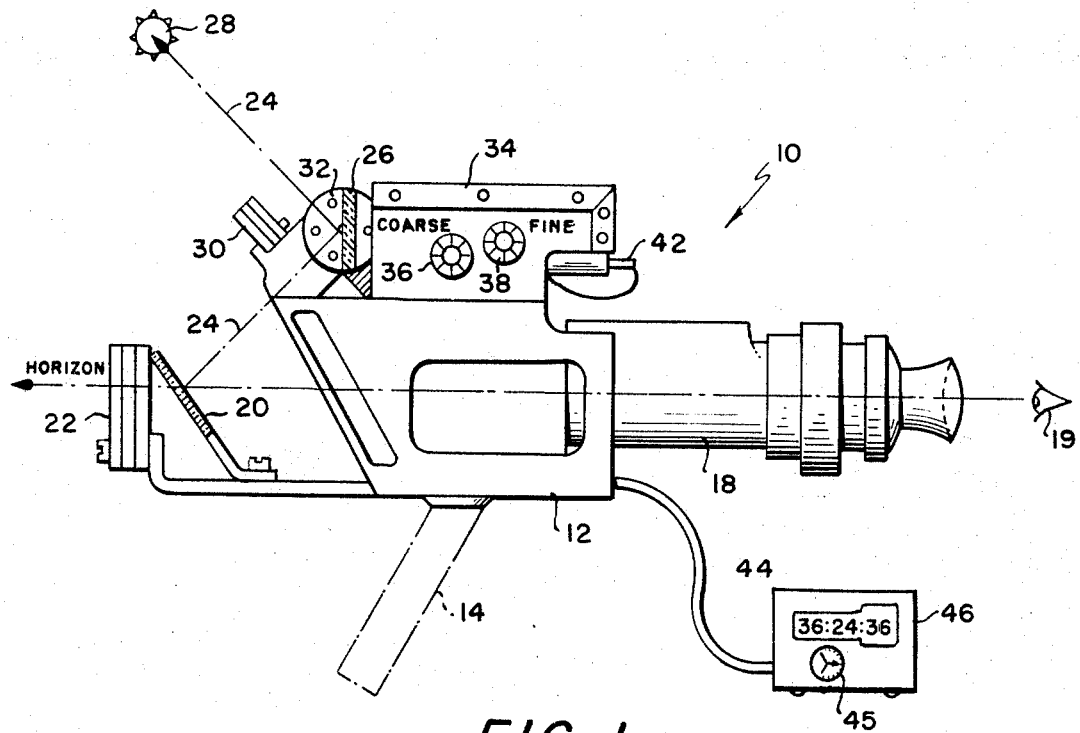
FIG. 1 is a side view of the sextant showing a light enhancing night viewing scope.
Figure 2:
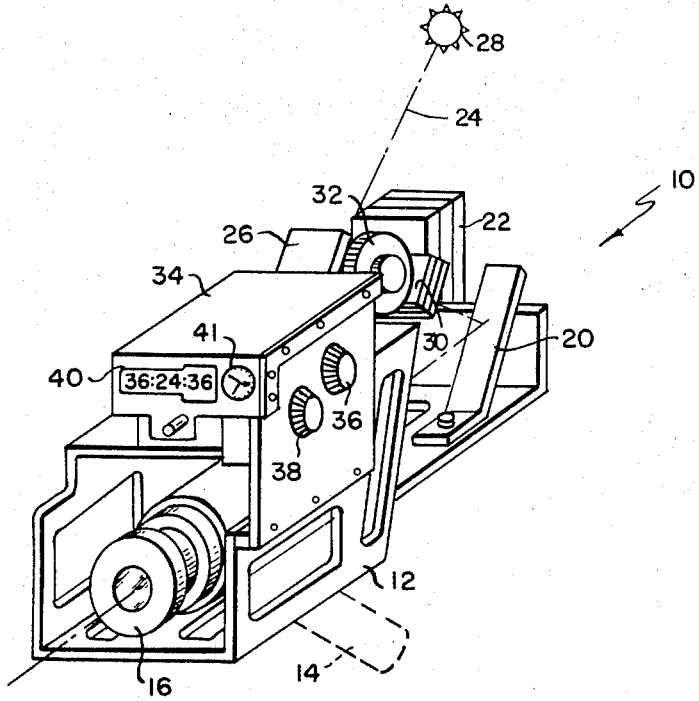
FIG. 2 is a perspective view of the sextant showing a telescope for daylight viewing.

Referring now to the drawings, wherein like reference numerals designate corresponding parts in the several views, there is shown in FIG. 1 generally a sextant 10 having a body 12 in the form of an elongate box opened at both ends. Affixed to the box frame body 12 is a handgrip 14 centrally located on the bottom of the box and movable along the line of sight to be approximately at the center of gravity when the instrument is in use. Mounted within the box frame body 12 is a telescope 16 as shown in FIG. 2 suitable for daylight viewing, if iron sights or a sighting tube (not shown) are not suitable. As shown in FIG. 1 a night scope 18 of the electronic image enhancing type may be used for viewing the horizon at night.

Attached at the forward end of the box frame 12 is a horizon mirror 20 which is silvered on either the left half or the right half to permit direct line of sight viewing of the horizon and a reflective view of the celestial body. Affixed forward of the horizon mirror is a set of horizon shades 22 which generally are filters of various densities and colors. On a line of sight 24 and rotatably mounted for tilting thereof is an index mirror 26 for further directing the line of sight 24 to a celestial body 28. Associated with and affixed adjacent the index mirror is a set of index mirror shades 30 which typically are filters of various densities and colors.

The index mirror 26 is mounted upon an index plate 32 which is rotatably attached to a control and gear box 34. The control and gear box 34 has contained therein a reduction gear train (not shown) which is ultimately connected to a coarse adjustment knob 36 and a fine adjustment knob 38. Also attached for rotation with the gear train is a digital readout counter display 40 which may be graduated in degrees minutes and seconds of arc or in degrees and decimals thereof. A time indicating display 41 may be mounted adjacent the digital readout counter 40 for obtaining the time of observation. For convenience of use during night time operation, the counter readout may be illuminated by a pilot lamp 42. Also for convenience of left- or right-handed persons, the coarse adjustment knob 36 and the fine adjustment knob 38 are duplicated on the other side of the control and gear box 34.

In addition to the digital readout indicator 40 on the rear of the instrument above the viewing telescope 16 and 18, remote readout of the angle of elevation of a celestial body may be obtained with the use of a digital readout remote display 46 electrically connected to the sextant 10 by a cable 44. A time indicating display 45 is also affixed to the remote display 46.

In operation, the sextant, equipped with either the daylight viewing iron sights or telescope 16, the night scope 18 is lifted and brought to the viewing position before the eye 19, and the horizon is sighted in the sights or in a telescope, and thus the operator is assured that the instrument will be held on a horizontal data plane. While held horizontally, the operator rotates the coarse adjustment knob 36 to tilt the mirror 26 thus bringing a celestial body 28 also into view in the eye piece of the telescope 16 along the sight line 24. The fine adjustment knob 38 may then be rotated to bring the image of the celestial body 28 exactly on the horizon as viewed through the clear portion of the half-silvered mirror 20 while rocking the instrument from side to side to get perfect coincidence of the celestial body image on the horizon. The operator then conveniently reads the angle of elevation in degrees, minutes and seconds or degrees and decimal degrees on the digital readout indicator 40 above the eye piece of the telescope 16 and records this indication along with the time of the observation from the time indicating display 41. During night operation, the light scope 18 may be used so as to greatly intensify the image of the otherwise unseen horizon so that an accurate coincidence of the horizon and the celestial body may be accomplished. To further aid in the operating of the sextant during night viewing, the remote display device 46 may be used by a helper who can record the time and the angle of elevation at the precise time of observation.

Obviously numerous modifications and variations of the present invention are possible in light of the above teachings. It is therefore to be understood that within the scope of the appended claims the invention may be practiced otherwise than as specifically described.

What is claimed as new and desired to be secured by Letters Patent of the United States is:

1. A hand held sextant adaptable for day and night use comprising:
   a box-shaped frame open at both ends along a line of sight;
   an electronic light enhancing telescope removably mounted in said frame along said line of sight;
   a horizon mirror affixed to said frame in optical alignment with said telescope;
   a gear train mounted on said frame;
   a tiltable index mirror coupled to said gear train in said line of sight;
   a digital read-out display indicator coupled to said gear train for indicating the tilt of said index mirror and thereby the angle of elevation of a celestial body, mounted on said frame above said telescope in facing relationship to the operator for viewing while operating said sextant;
   a time display indicator mounted adjacent and viewable simultaneously with said digital read-out display; and
   manual coarse and fine adjustment means coupled to said gear train for affecting the tilt of said index mirror.

2. The sextant of claim 1 wherein said digital readout display indicator further includes:
   a shaft encoder coupled to said gear train to provide an output related to shaft rotation, and
   a remote digital display indicator connected to said shaft encoder to provide an indication of the angle of elevation of a celestial body at a position remote from the sextant, a time display indicator mounted adjacent said display.

3. The sextant of claim 1 further comprising:
   a handgrip movably attached to said frame for balanced holding of said sextant in use;
   a pair of coarse adjustment knobs connected to said gear train;
   a pair of fine adjustment knobs connected to said gear train;
   whereby one of each pair is on opposite sides of said control and gear box for convenient use by both left- and right-handed operators;
   a set of horizon mirror filter shades in the line-of-sight of the horizon;
   a set of index mirror filter shades in the line-of-sight of the celestial body; and
   a pilot lamp adjacent said digital read-out indicator.

* * * * *